United States Patent
Park

(10) Patent No.: US 6,708,111 B2
(45) Date of Patent: Mar. 16, 2004

(54) ROUTE ENTRY GUIDING DEVICE AND METHOD IN A NAVIGATION SYSTEM USING A PORTABLE TERMINAL

(75) Inventor: Sang-Ho Park, Anyang-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/138,872

(22) Filed: May 3, 2002

(65) Prior Publication Data

US 2002/0165664 A1 Nov. 7, 2002

(30) Foreign Application Priority Data

May 3, 2001 (KR) ........................................ 2001-24175
Apr. 18, 2002 (KR) ........................................ 2002-21134

(51) Int. Cl.$^7$ ............................................. G01C 21/28
(52) U.S. Cl. ..................... 701/209; 701/200; 73/178 R; 340/988
(58) Field of Search ................................. 701/209, 200, 701/201, 213; 73/178 R; 340/988, 989, 993, 990, 994, 995

(56) References Cited

U.S. PATENT DOCUMENTS

| | | | |
|---|---|---|---|
| 5,512,904 A | * | 4/1996 | Bennett .................. 342/357.14 |
| 5,983,158 A | * | 11/1999 | Suzuki et al. ................ 701/209 |
| 6,049,753 A | * | 4/2000 | Nimura ....................... 701/201 |
| 6,125,323 A | * | 9/2000 | Nimura et al. ............... 701/207 |
| 6,182,005 B1 | * | 1/2001 | Pilley et al. ................. 701/120 |

OTHER PUBLICATIONS

Korean Patent Application No. 45851 entitled "*Navigation System Using Wireless Communication Network and Route Guidance Method Thereof*", filed Jul. 30, 2001. (A Certified Translation of this Korean Patent Application is also included.).

* cited by examiner

*Primary Examiner*—William A. Cuchlinski, Jr.
*Assistant Examiner*—Olga Hernandez
(74) *Attorney, Agent, or Firm*—Dilworth & Barrese, LLP

(57) ABSTRACT

A route entry guidance device and method in a navigation system using a portable terminal. A navigation component in the route entry guidance device transmits information about a departure point and a destination entered by a user to a traffic information center over a wireless network and receives optimum route data from the traffic information center over the wireless network, using a transmitter/receiver. If the optimum route data does not include a road corresponding to the present position of a vehicle, the navigation component determines a guiding mode according to the shortest distance, the heading of the vehicle with respect to true north, the direction to the optimum route, and a route direction, using a guiding mode determiner, a heading determiner, a projection direction determiner, and a route direction determiner. Then, the navigation component guides the vehicle to the entry to the optimum route according to the determined guiding mode, direction to the optimum route, and route direction.

10 Claims, 19 Drawing Sheets

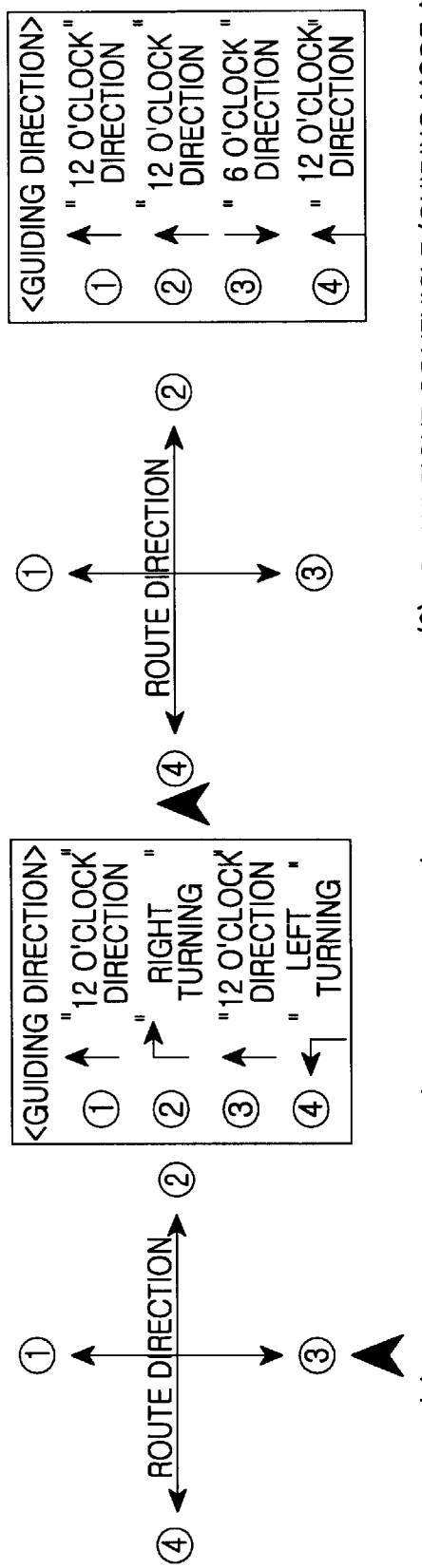

(4) TO THE LEFT OF VEHICLE (GUIDING MODE C)

(3) BEHIND VEHICLE (GUIDING MODE C)

ROUTE ENTRY GUIDING DEVICE AND METHOD IN A NAVIGATION SYSTEM USING A PORTABLE TERMINAL

PRIORITY

This application claims priority to an application entitled "Route Entry Guiding Device and Method in Navigation System Using Portable Terminal" filed in the Korean Industrial Property Office on May 3, 2001 and assigned Serial No. 2001-24175, and to an application entitled "Route Entry Guiding Device and Method in Navigation System Using Portable Terminal" filed in the Korean Industrial Property Office on Apr. 18, 2002 and assigned Serial No. 2002-21134, the contents of both of which are hereby incorporated by reference.

BACKGROUND OF THE INVENTION

1. Field of the Invention

The present invention relates generally to a navigation system, and in particular, to a route entry guiding device and method in a navigation system using a portable terminal.

2. Description of the Related Art

Navigation systems or GPS (Global Positioning System) devices are commonly used in aircrafts, boats and other types of moving objects in order to track their positions and check their speeds.

A typical navigation system pinpoints the present position of a moving object on a displayed map using GPS information. It also provides information necessary for driving, such as the direction the moving object is pointing (heading), the present speed of the moving object, a route set by a driver before he starts, and an optimum route to his destination. This navigation system calculates the present position of the moving object based on GPS satellite signals including three-dimensional coordinate information (latitude, longitude and altitude) and provides map information including the present position to the driver visibly or audibly.

In general, a navigation device includes a GPS receiver for receiving GPS satellite signals and calculating pseudo-present position coordinates, a sensor unit having a gyro-sensor and a speed sensor for sensing the turning direction and speed of a vehicle, respectively, and a map data storage.

A navigation-enabled vehicle receives traffic information through an LCD (Liquid Crystal Display) and a speaker of a portable terminal. The traffic information contains traffic conditions or route guidance for guiding the driver to avoid congested roads. This is disclosed in Korean Patent Application No. 45851, entitled "Navigation System Using Wireless Communication Network and Route Guidance Method Thereof" and filed on Jul. 30, 2001 by the present applicant.

Conventional navigation services are limited only to route guidance when a driver travels in a route provided from a traffic information center or a CD-ROM (Compact Disk-Read Only Memory) and simply pinpoints the position of a vehicle on a digital map displayed on an LCD when off track from the route. In other words, conventional navigation systems provide route guidance information visibly or audibly only if the vehicle is on a predetermined road on the digital map, and provides no guidance to the driver when off track.

SUMMARY OF THE INVENTION

It is, therefore, an object of the present invention to provide a route entry guiding device and method for guiding a vehicle to an entry to a route in a navigation system using a portable terminal.

It is another object of the present invention to provide a route entry guiding device and method for guiding a vehicle to enter an optimum route defined on a digital map through a portable terminal without a graphic device to display the digital map.

The foregoing and other objects of the present invention are achieved by providing a route entry guidance device and method in a navigation system using a portable terminal. In the route guidance device, a navigation component of the portable terminal has a transmitter/receiver, a guiding mode determiner, a heading determiner, a projection direction determiner, and a route direction determiner. The transmitter/receiver transmits information including a departure point and a destination entered by a user to a traffic information center over a wireless network and receives optimum route data from the traffic information center over the wireless network in response to the transmitted information. The guiding mode determiner calculates the shortest distance to an optimum route indicated by the optimum route data and determines a guiding mode according to the shortest distance, if the optimum route data does not include a road where a vehicle is currently positioned. The heading determiner determines the heading of the vehicle with respect to true north using the latitude and longitude coordinates of two points measured by a GPS. The projection direction determiner calculates a relative angle of a projection direction to the optimum route with respect to the vehicle and determines the direction to the optimum route according to the calculated relative projection direction angle. The route direction determiner calculates a relative angle of the direction the optimum route runs with respect to the vehicle and determines a route direction according to the calculated relative route direction angle. According to the determined guiding mode, direction to the optimum route, and route direction, the vehicle is guided to the entry to the optimum route.

BRIEF DESCRIPTION OF THE DRAWINGS

The above and other objects, features and advantages of the present invention will become more apparent from the following detailed description when taken in conjunction with the accompanying drawings in which:

FIGS. 3A to 3D illustrate the direction routes run and the directions to the routes from a vehicle determined by the determination methods illustrated in FIGS. 2A to 2D in a guiding mode A according to the embodiment of the present invention;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
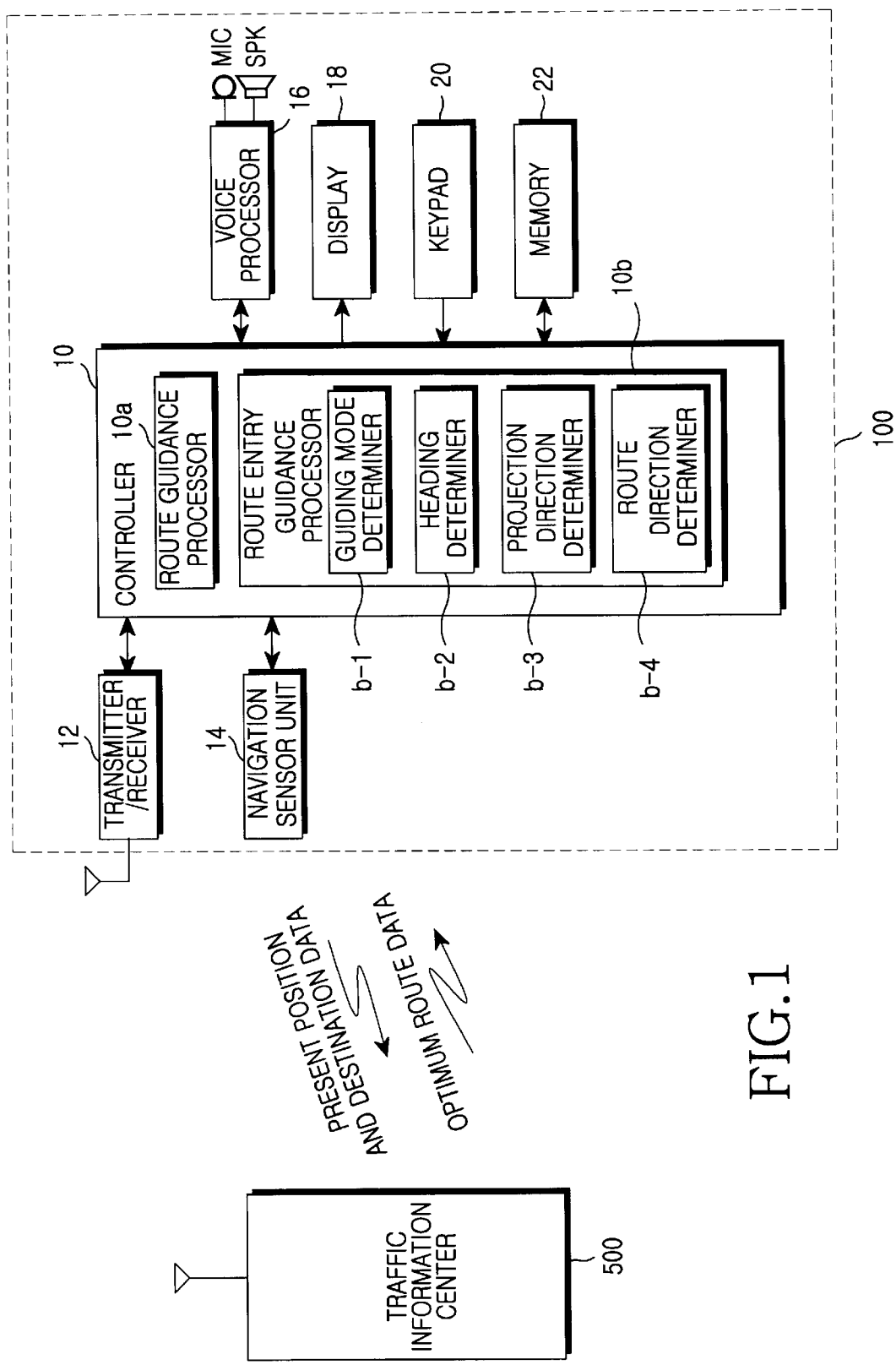
FIG. 1 is a block diagram of a navigation component for guiding a driver to a route entry along with a traffic information center for wirelessly communicating with the navigation component according to an embodiment of the present invention.

FIG. 1 is a block diagram illustrating a navigation component for guiding a driver to a route entry and a traffic information center for wirelessly communicating with the navigation component according to an embodiment of the present invention. Referring to FIG. 1, a controller 10 provides overall control to the navigation component capable of route entry guidance. If the navigation component co-functions as a mobile terminal, the controller 10 controls both mobile communication and route entry guidance. The controller 10 includes a route guidance processor 10a and a route entry guidance processor 10b. The route entry guidance processor 10b includes of a guiding mode determiner b-1, a heading determiner b-2, a projection direction determiner b-3, and a route direction determiner b-4.

A transmitter/receiver 12 processes a navigation signal and a mobile communication signal discriminately. With a navigation signal, the transmitter/receiver 12 feeds the navigation signal to a navigation sensor unit 14 and, at the same time, it notifies the controller 10 that the input signal is the navigation signal. With a mobile communication signal, the transmitter/receiver 12 outputs a signal indicating the reception of the signal from a mobile communication system to the controller 10 and the received signal to a voice processor 16. Only voice data is output to the voice processor 16. Upon receipt of text data or graphic data, the transmitter/receiver 12 outputs either to the controller 10.

The voice processor 16 converts the received voice data to an electrical voice signal by decoding and decompressing, and outputs the voice signal to a speaker SPK. The voice processor 16 also converts an electrical voice signal received from a microphone MIC to voice data by compressing and encoding, and outputs the voice data to the transmitter/receiver 12. For route entry guidance in the present invention, the voice processor 16 processes a voice message for route entry guidance under the control of the controller 10 and outputs it through the speaker SPK.

A display 18 displays the operational state of the terminal in a mobile communication mode under the control of the controller 10. Using route entry guidance according to the present invention, the display 18 displays route entry guidance-related information under the control of the controller 10. During a navigation service, after the route entry guidance, the display 18 displays route information, direction information, and a reservation alarm sign under the control of the controller 10. A keypad 20, in the form of a key matrix, includes digit keys for dialing and function keys designated for route entry guidance. The keypad 20 generates a key signal corresponding to a key pressed by a user and outputs it to the controller 10. A memory 22 has an area for storing programs necessary to operate the navigation component as a mobile terminal, an area for storing optimum route data needed to guide the user to an entry of a route, and an area for temporarily storing data generated during a control operation.

FIGS. 2A to 2D illustrate the operations of the determiners in the route entry guidance processor 10b illustrated in FIG. 1.

Figure 2B:
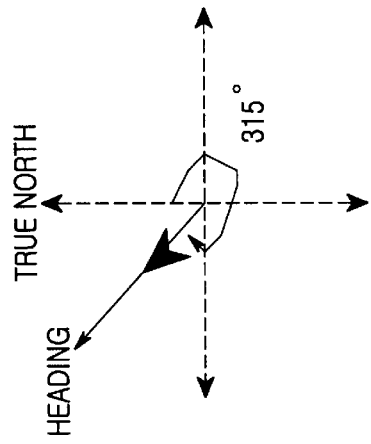
FIGS. 2A to 2D depict in detail the operations of determiners in a route entry processor illustrated in FIG. 1.
Figure 2D:
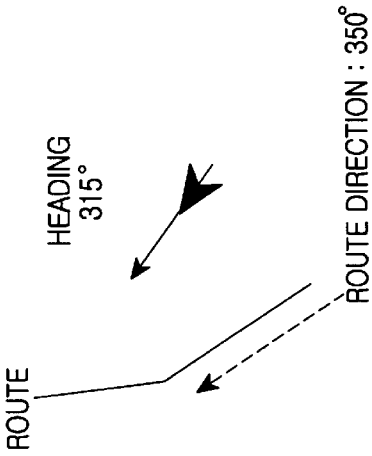
Figure 2A:
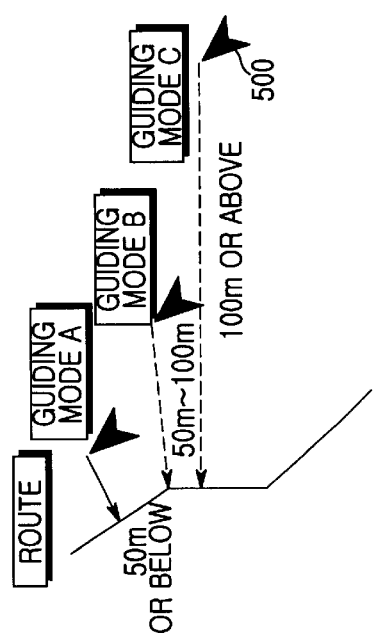

FIG. 2A illustrates an operation for determining a guiding mode A, B or C according to the distance to a given route. Reference numeral 500 denotes a vehicle. In FIG. 2A, if the distance is 50 m or less, the first guiding mode A is selected, if the distance is between 50 m and 100 m, the second guiding mode B is selected, and if the distance is 100 m or greater, the third guiding mode C is selected. Accordingly, guiding mode A is entered when there is a short direct path to the route, guiding mode B is entered when the vehicle is close to the route (i.e., the route is in sight) but the driver may have to make an extra turn to get around a physical obstacle such as a building to get to the route, and mode C is entered when there is no direct path to the route (i.e., buildings, parks, or construction in the way), and the driver must travel in an around about way to get to the route. The distances for the guiding modes can be set appropriately.

FIG. 2B illustrates an operation for determining the heading of the vehicle measured clockwise with respect to true North (in azimuth angle 0°). The heading of the vehicle is calculated in azimuth angle using the GPS-measured latitude and longitude coordinates of two waypoints. Instantaneous angular speed obtained from a gyro-sensor is also considered in determining the heading.

Figure 2C:
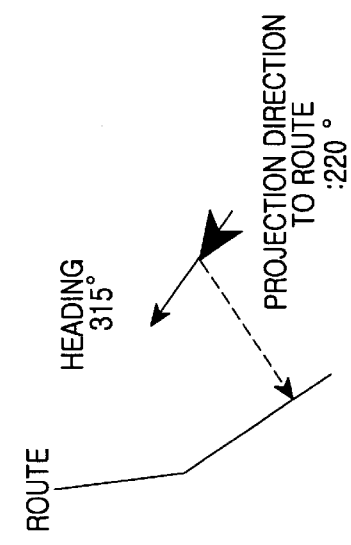

FIG. 2C illustrates an operation for determining the direction to the route according to a relative angle of a projection direction to the route measured with respect to the heading of the vehicle. Four directions to the route are defined according to the relative angle of the projection direction to the route with respect to the heading of the vehicle. If the relative angle of the projection direction is 0° to 45°, the route is ahead of the vehicle. If the relative angle of the projection direction is 46° to 135°, the route is to the right of the vehicle. If the relative angle of the projection direction is 136° to 225°, the route is behind the vehicle. If the relative angle of the projection direction is 226° to 315°, the route is to the left of the vehicle. If the relative angle of the projection direction is 316° to 359°, the route is ahead of the vehicle. For example, if the projection direction angle is 220° in azimuth and the heading of the vehicle is 315° as illustrated in FIG. 2C, subtracting 315 from 220 gives −95°, i.e., 265°. Thus, the route is to the left of the vehicle.

FIG. 2D illustrates an operation for determining the direction the route runs with respect to the vehicle according to a relative angle of the route direction with respect to the vehicle heading. Four route directions are defined. If the relative route direction angle is 0° to 45°, the route runs in the same direction as the vehicle. If the relative route direction angle is 46° to 135°, the route runs to the right of the vehicle. If the relative route direction angle is 136° to 225°, the route runs in the opposite direction the vehicle is traveling. If the relative route direction angle is 226° to 315°, the route runs to the left of the vehicle. If the relative route direction angle is 316° to 359°, the route runs in the same direction as the vehicle. In the above example, subtracting the vehicle heading 315° from the route direction azimuth angle 350° gives 35° and thus the route runs in the same direction as the vehicle.

Figure 9:
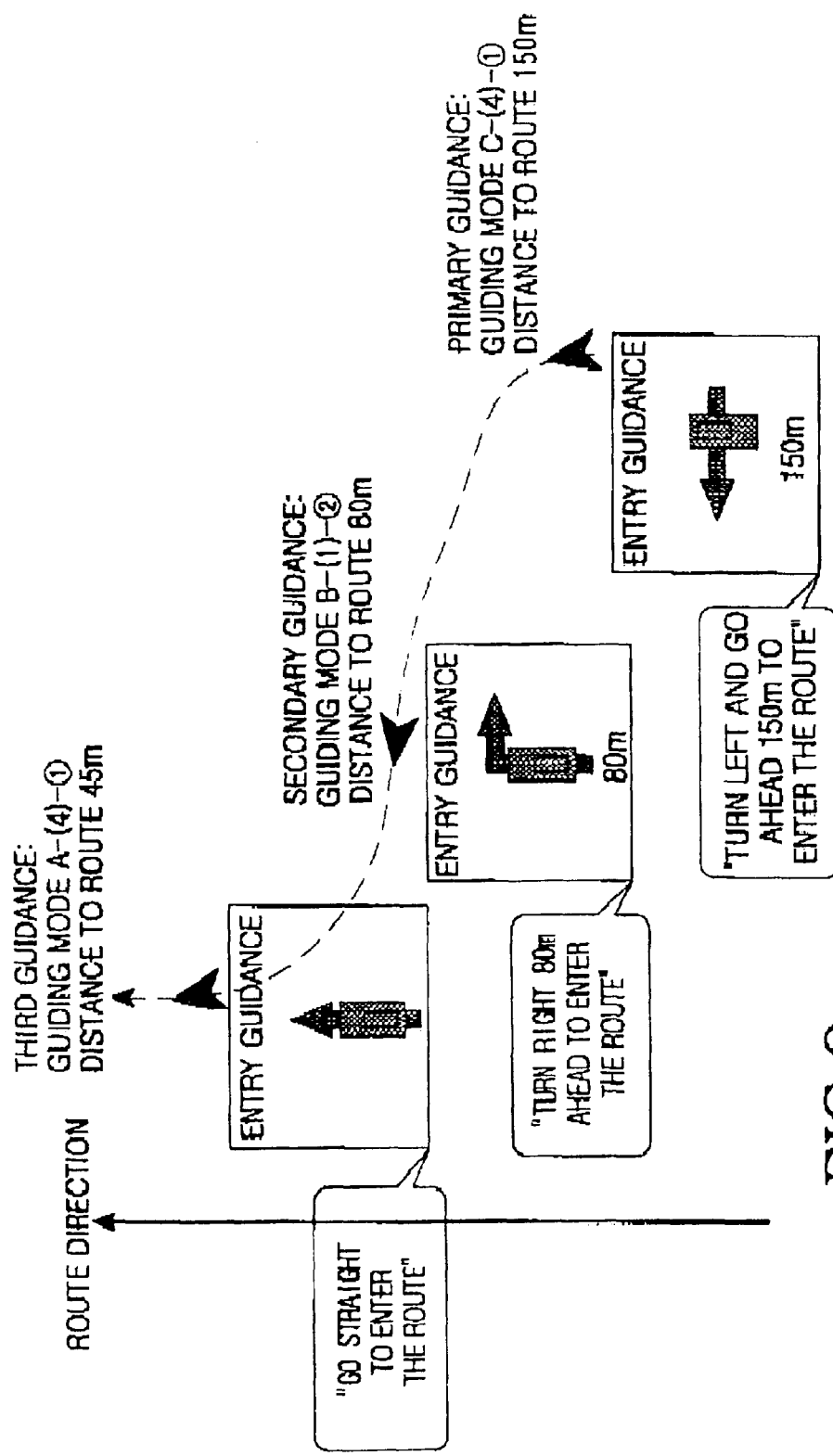
FIGS. 9 and 10 illustrate embodiments of a method of guiding a vehicle to the entry to a route in the guiding modes according to the present invention.
Figure 10:
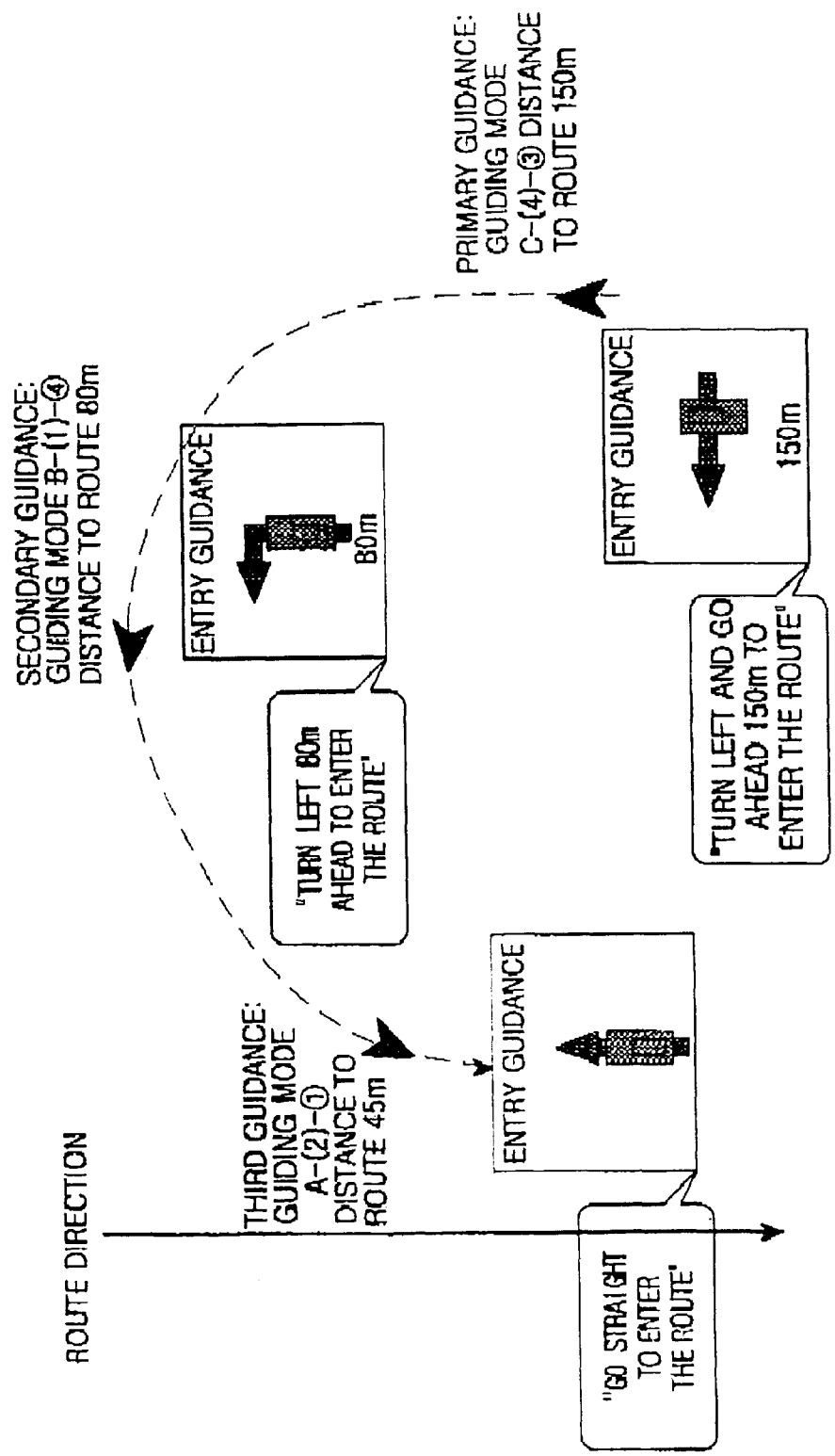

According to a guiding mode determined by the operations illustrated in FIGS. 2A to 2D, graphical representations and voice announcements are provided as illustrated in FIGS. 9 and 10.

FIGS. 3A to 5D illustrate route directions and guiding directions in the guiding modes A, B and C according to the directions to the route from the present position of the vehicle.

Figures 3C, 3D:
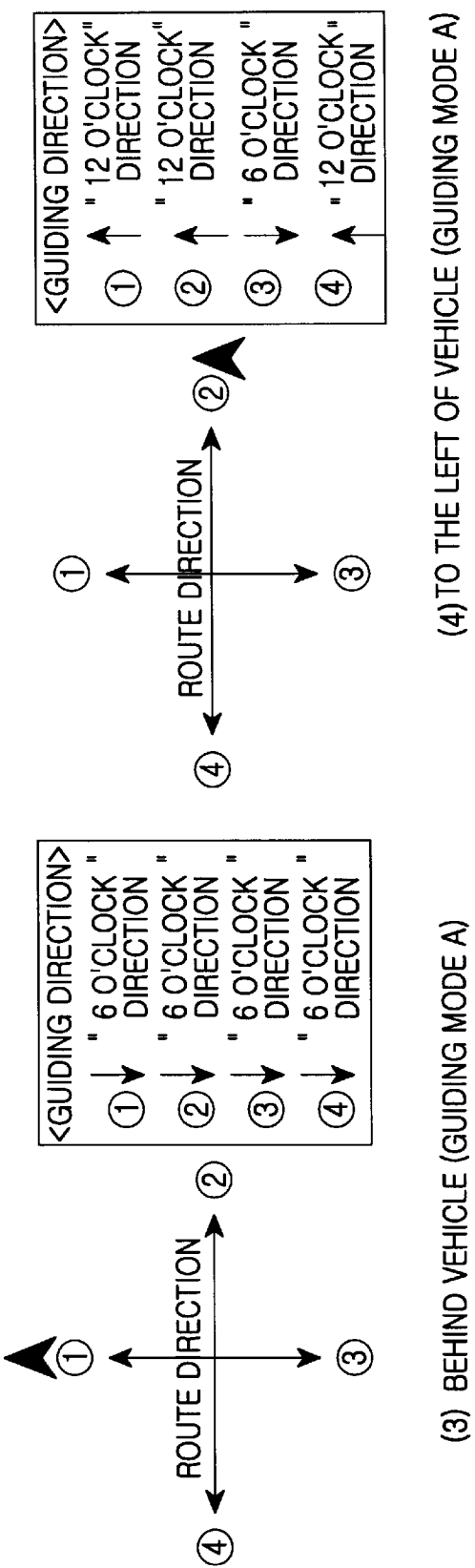
Figures 4A, 4B:
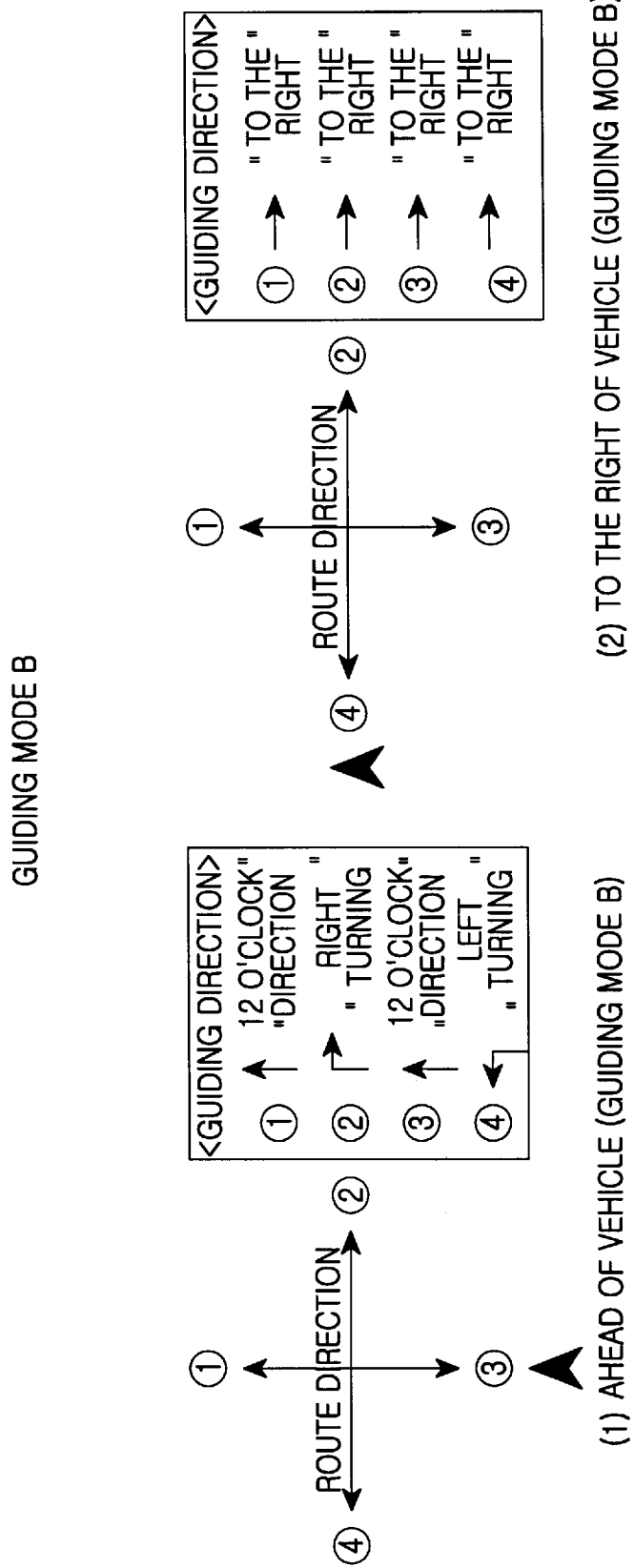
FIGS. 4A to 4D illustrate the direction routes run and the directions to the routes from the vehicle determined by the determination methods illustrated in FIGS. 2A to 2D in a guiding mode B according to the embodiment of the present invention.
Figures 4C, 4D:
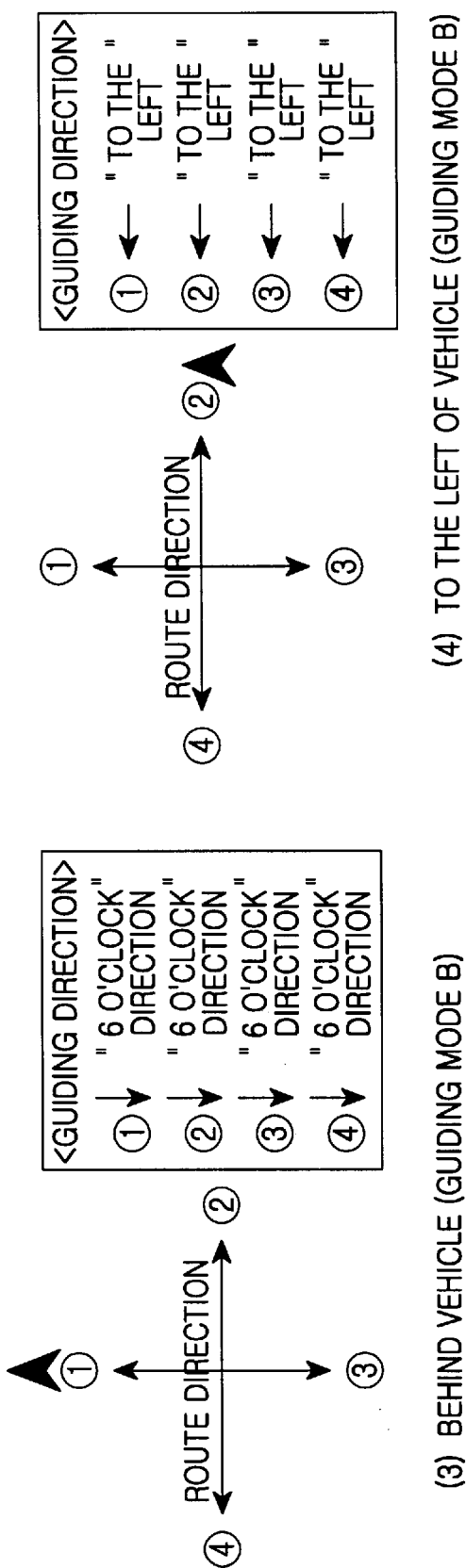
Figures 5A, 5B:
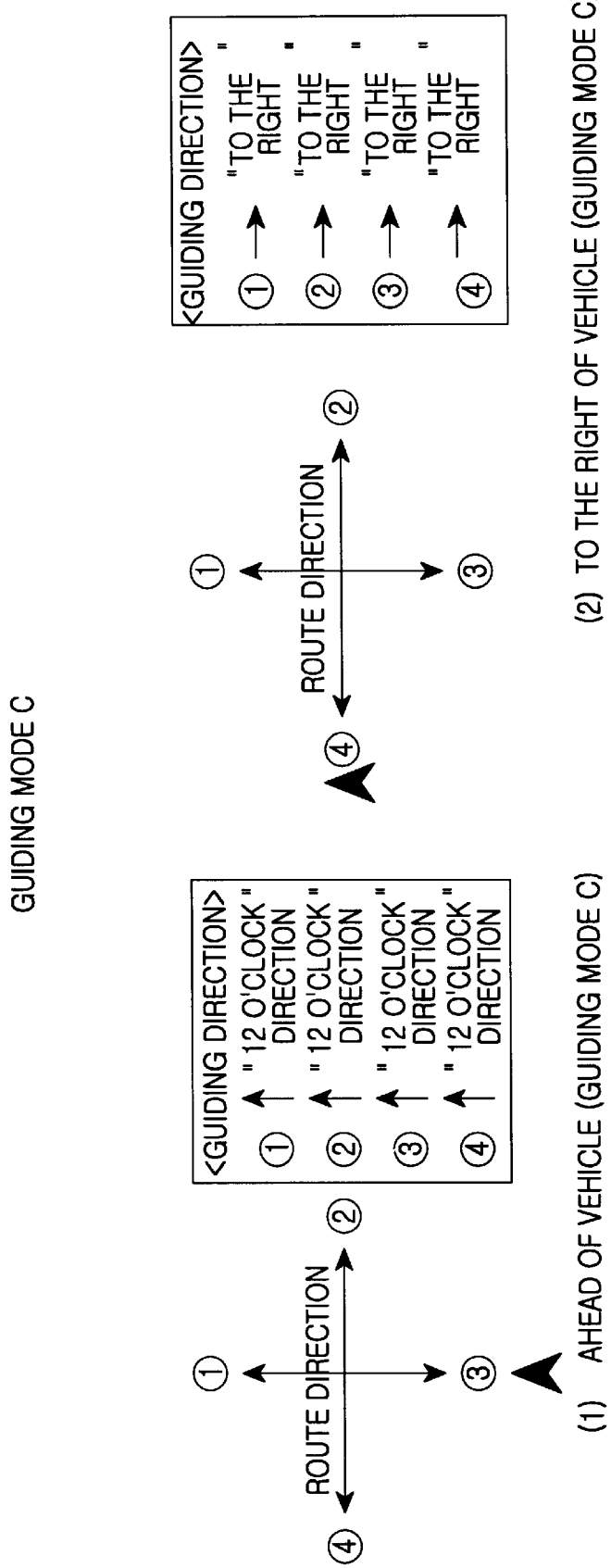
FIGS. 5A to 5D illustrate the direction routes run and the directions to the routes from the vehicle determined by the determination methods illustrated in FIGS. 2A to 2D in a guiding mode C according to the embodiment of the present invention.
Figure 5D:
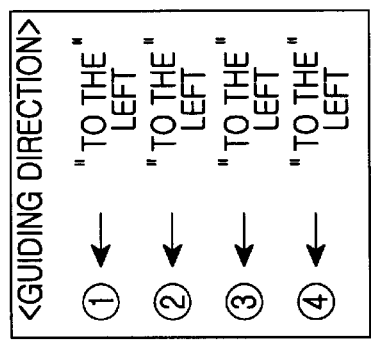
Figure 5C:
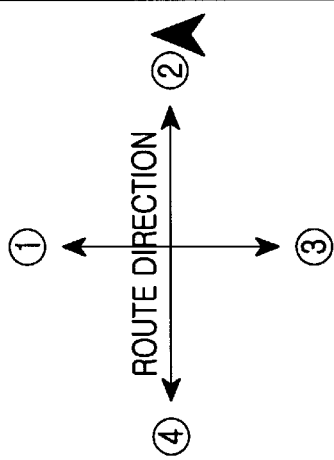

FIGS. 3A to 3D illustrate route directions and guiding directions according to the directions to the route in the guiding mode A. Audible and visible route entry guidance is provided in the same manner in FIGS. 3A to 3D and thus only FIG. 3A will be described on behalf of the figures. FIG. 3A illustrates the case where the route is ahead of the vehicle (1). If the route runs in a direction ①, the controller 10 displays "12 o'clock direction" and "↑" on the LCD of the display 18 and outputs a voice message "the route entry is in the 12 o'clock direction" through the voice processor 16 and the speaker SPK.

FIGS. 4A to 4D illustrate route directions and guiding directions according to the directions to the route in the guiding mode B, and FIGS. 5A to 5D illustrate route directions and guiding directions according to the directions to the route in the guiding mode C. Audible and visible route entry guidance is provided in the same method as described above.

FIGS. 6A to 6G illustrate route entry guidance under real road conditions in connection with FIGS. 3A to 3D. Route entry guidance in the present invention refers to guiding the vehicle to the entry to the route. If the vehicle is remote from the route, the guiding mode B or C is chosen. When the guiding mode A is chosen for the vehicle relatively near to the route, the vehicle should be guided directly to enter the route. However, if the direct guidance to the route is not available, the vehicle is guided to the route entry by changing the guiding modes under the circumstances.

Figure 6A:
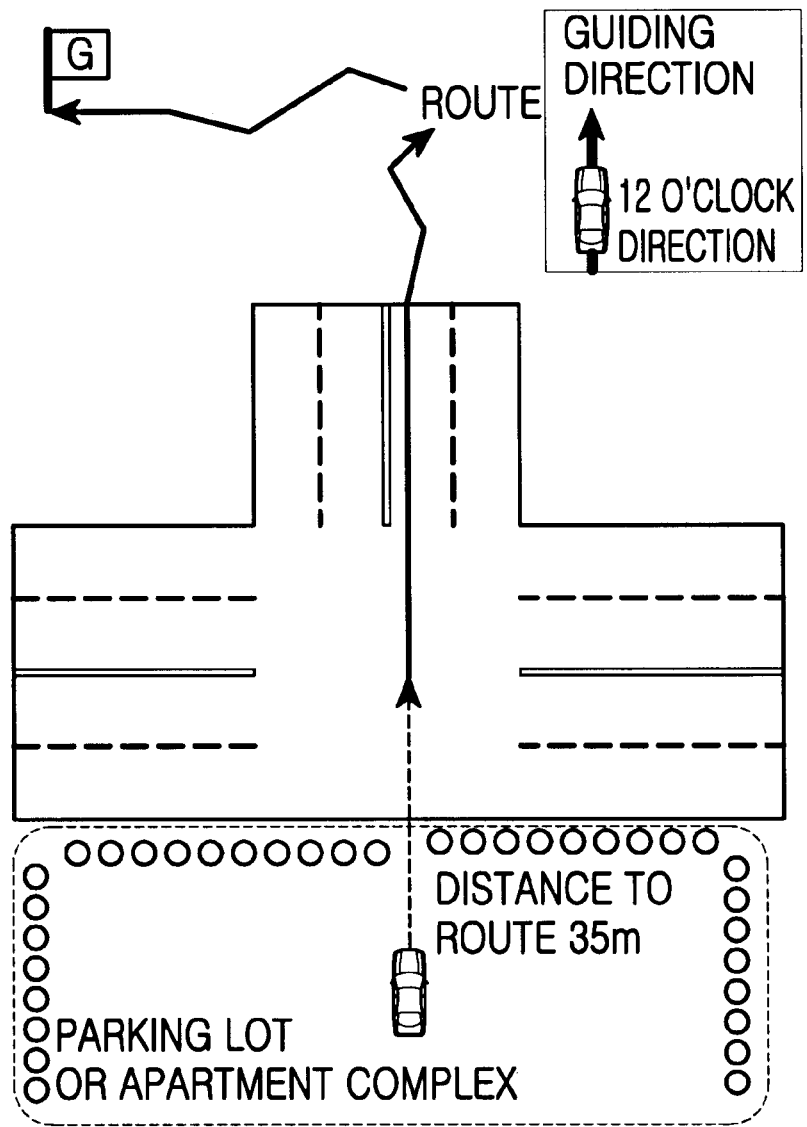
FIGS. 6A to 6G illustrate route entry guidance in real road conditions in connection with FIGS. 3A to 3D.

FIG. 6A illustrates route entry guidance when the guiding mode is A, the route is ahead of the vehicle, and the route runs in the same direction as the vehicle (represented by A-(1)-①), and going straight is available at an intersection. Referring to FIG. 6A, the shortest distance to the route is below 50 m, the route runs in the same direction as the vehicle, and the vehicle goes ahead at the intersection in the 12 o'clock direction. Thus, the vehicle enters the route easily.

Figure 6B:
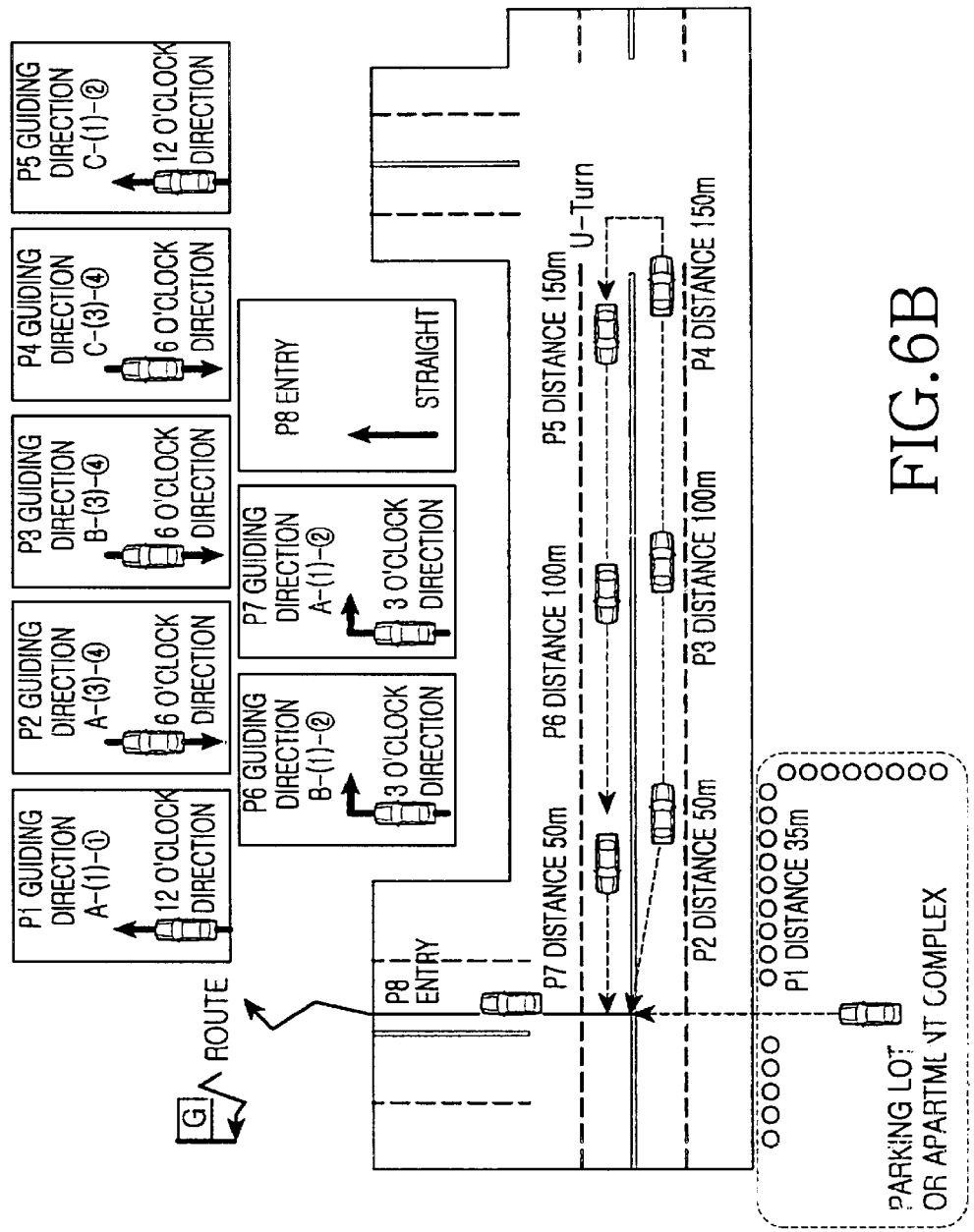

FIG. 6B illustrates route entry guidance in the case where A-(1)-① is chosen as a guiding mode but going straight and turning left are prohibited at the intersection. Referring to FIG. 6B, if the vehicle turns right at a point P1 and reaches a point P2, the distance to the route at the point P2 is below 50 m and the route behind the vehicle runs to the left of the vehicle. Here, the guiding mode is changed to A-(3)-④. When the vehicle reaches a point P3, the guiding mode becomes B-(3)-④. Then, the vehicle is guided to enter the route via points P4 to P8.

Figure 6C:
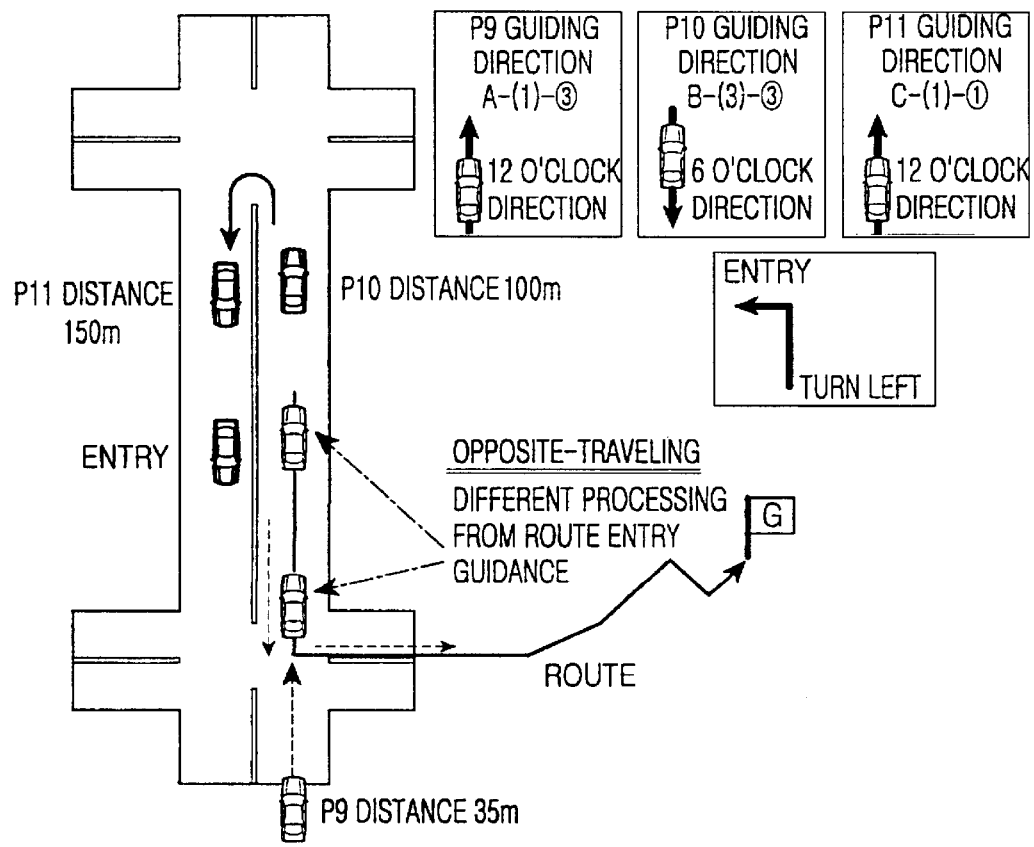

FIG. 6C illustrates route entry guidance when the vehicle is in different positions when requesting route information and after downloading the route information and thus the guiding mode A-(1)-③ is chosen instead of A-(1)-②. If the route is ahead of the vehicle at a point P9 and the route runs in the opposite direction the vehicle travels, the guiding mode is A-(1)-③, the guiding direction is the 12 o'clock direction. Then, the vehicle goes straight and enters the route via points P10 and P11 with the aid of corresponding guidance at the respective points.

Figure 6D:
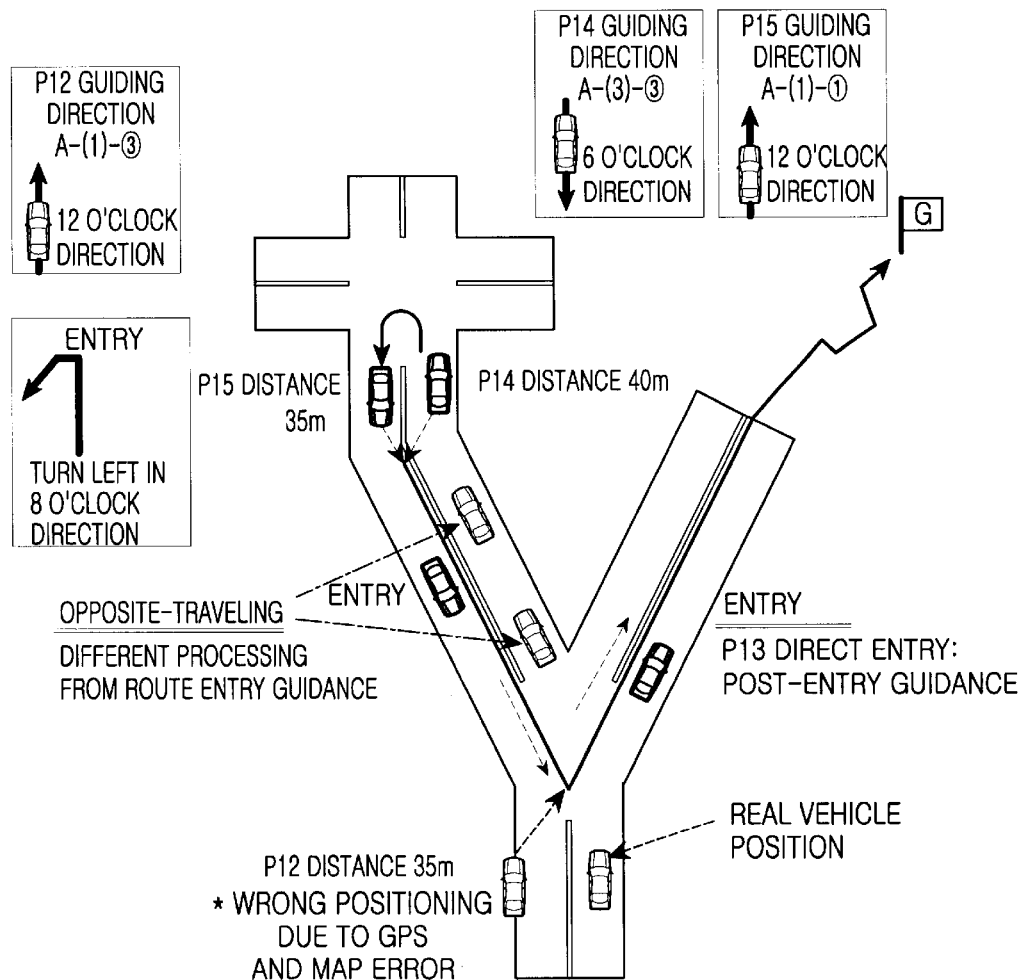

FIG. 6D illustrates route entry guidance when the real position of the vehicle is incorrectly measured at point P12 due to errors in the GPS, sensors, and a digital map. If the route is ahead of the vehicle at the point P12 and the route runs in the opposite direction the vehicle travels, the guiding mode is A-(1)-③ and thus the guiding direction is the 12 o'clock direction. If the vehicle reaches a point P13, it directly enters the route. On the other hand, if the vehicle travels in the opposite direction to the route direction and reaches a point 14, the vehicle is guided to take the 6 o'clock direction in the guiding mode A-(3)-③. Then, the vehicle is guided from a point P15 to enter the route in the guiding mode A-(1)-①.

Figure 6E:
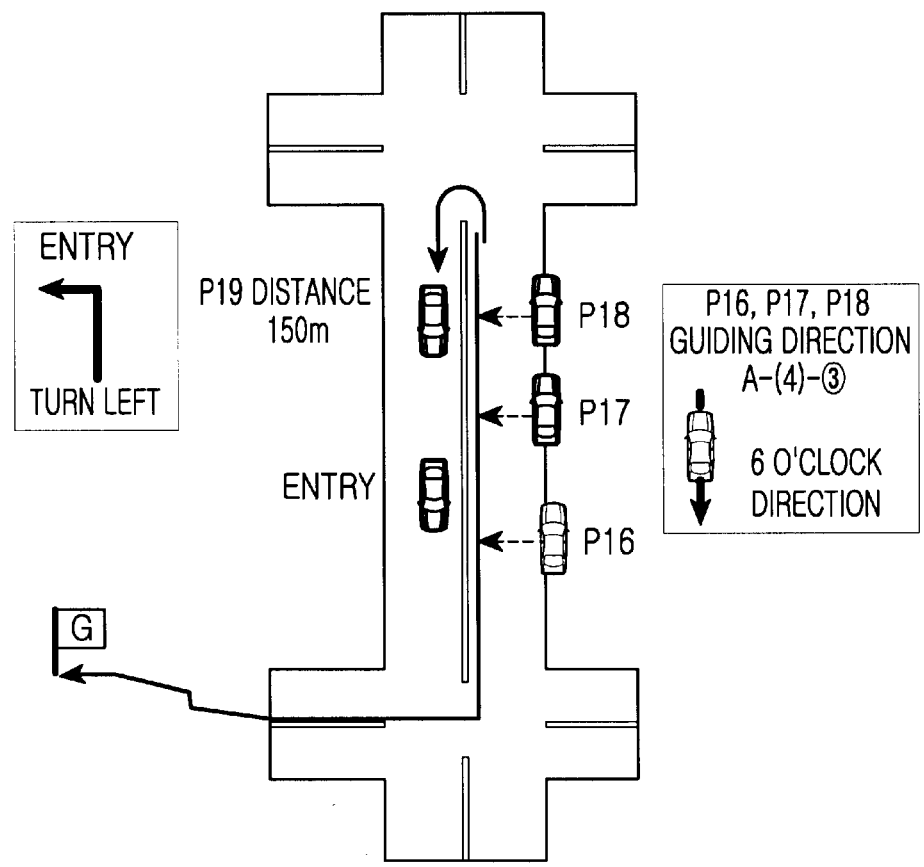

FIG. 6E illustrates route entry guidance when the vehicle is opposite-traveling via points P16, 17 and 18 due to errors in the GPS, sensors, and digital map but it is determined that the vehicle is traveling in parallel to the route along the opposite direction of the route, and thus the guiding mode A-(1)-③ is chosen. At the points 16, 17 and 18, the route is to the left of the vehicle and runs in the opposite direction the vehicle travels, the guiding mode is A-(4)-③ and the vehicle is guided to take the 6 o'clock direction. Thus, the vehicle takes a U-turn and then enters the route at a point P19.

Figure 6F:
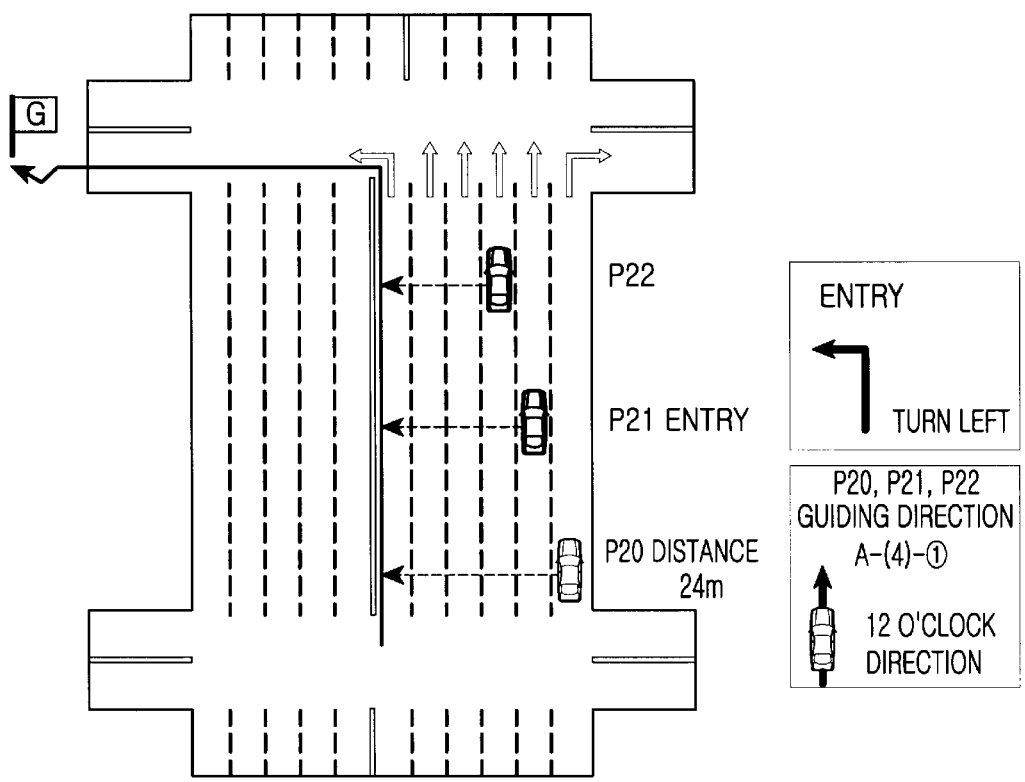

FIG. 6F illustrates route entry guidance when a guiding mode A-(4)-③ is chosen. The vehicle runs on a very wide road. If route information is requested at a point P20 and the route illustrated in FIG. 6F is downloaded, since the route is expressed as a line, it may be determined that the vehicle is spaced from the route by some distance even though it is on the route. Or it may be determined that the vehicle is traveling on another route in parallel to the route. This phenomenon can be worsened due to errors in the GPS, sensors, and digital map. If the vehicle is stationary at the point P20, it cannot be directly determined that the vehicle is in the route. In this case, the guiding mode is A-(4)-① and the vehicle is guided to take the 12 o'clock direction. After the vehicle travels for a predetermined distance, it is determined that the vehicle is in the route and then route guidance is provided.

Figure 6G:
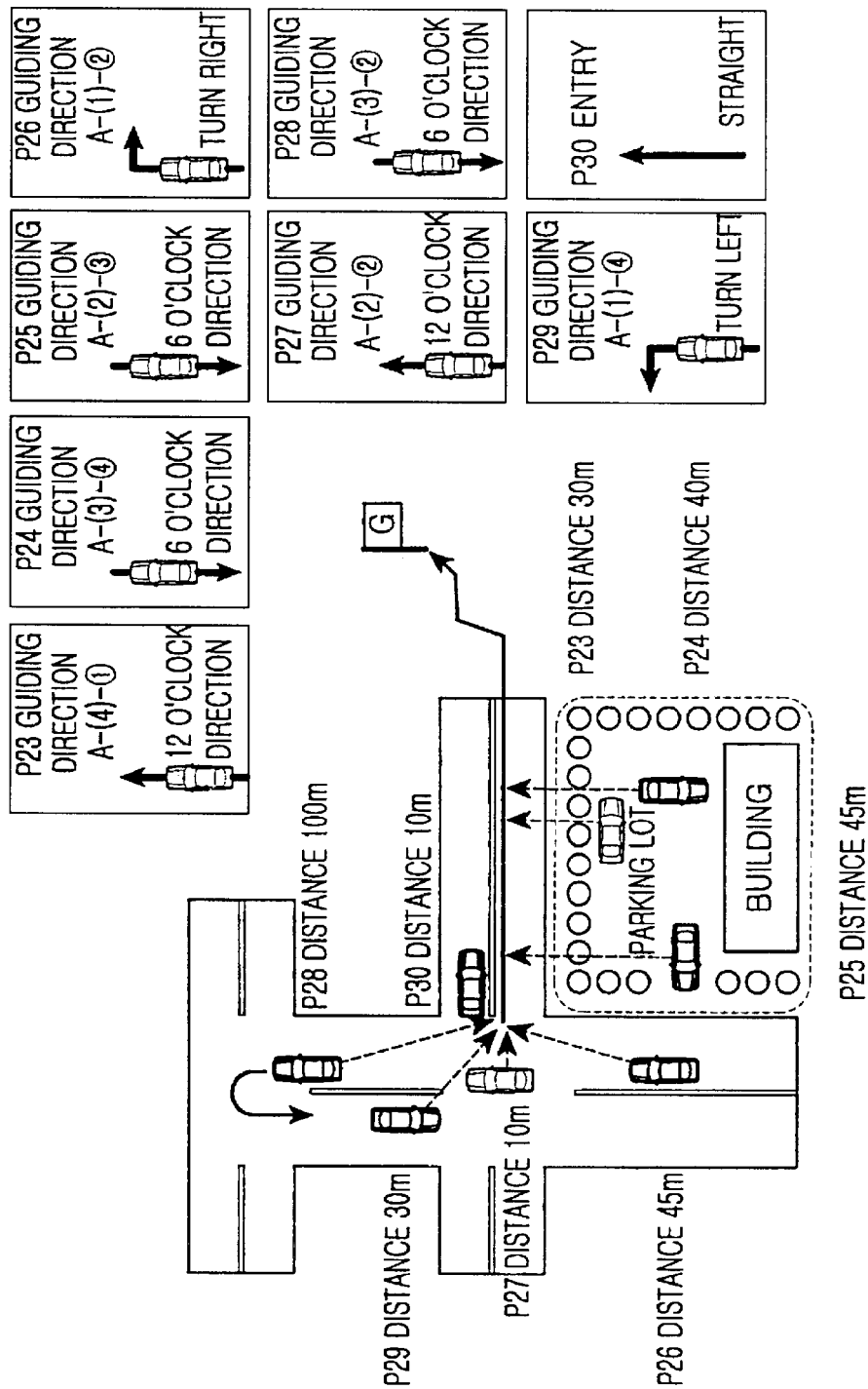

FIG. 6G illustrates route entry guidance when the guiding mode A-(2)-② is chosen. When route information is requested at a point P23 within a parking lot, the guiding mode A-(4)-① is set and the guiding direction is the 12 o'clock direction. If the vehicle can take the 12 o'clock direction to get out of the parking lot, the route entry guidance is easily fulfilled. However, if the exit of the parking lot is located as illustrated in FIG. 6G, the vehicle should travel via points P24, 25 and 26. At the point P26, the vehicle is guided to turn left in the guiding mode A-(1)-②. If the driver does not turn left due to his carelessness or traffic conditions, the vehicle reaches a point P28. Here, the vehicle is not supposed to go straight in real conditions. Therefore, the vehicle is guided to take the 12 o'clock direction further from the route. Then, while the guiding mode A is changed to the guiding mode B and returns to itself, the vehicle is guided to enter the route. At the point P28, the guiding mode B-(3)-② is set, and the vehicle takes a U-turn and travels to a point P29. The guiding mode is changed to A-(1)-④ and the vehicle is guided to turn left. If the point P29 is very remote from the route, it is determined that the vehicle is off track and route information is requested at the point. That is, even though the vehicle does not succeed in entering the route at one time, it can attempt again.

Figure 7:
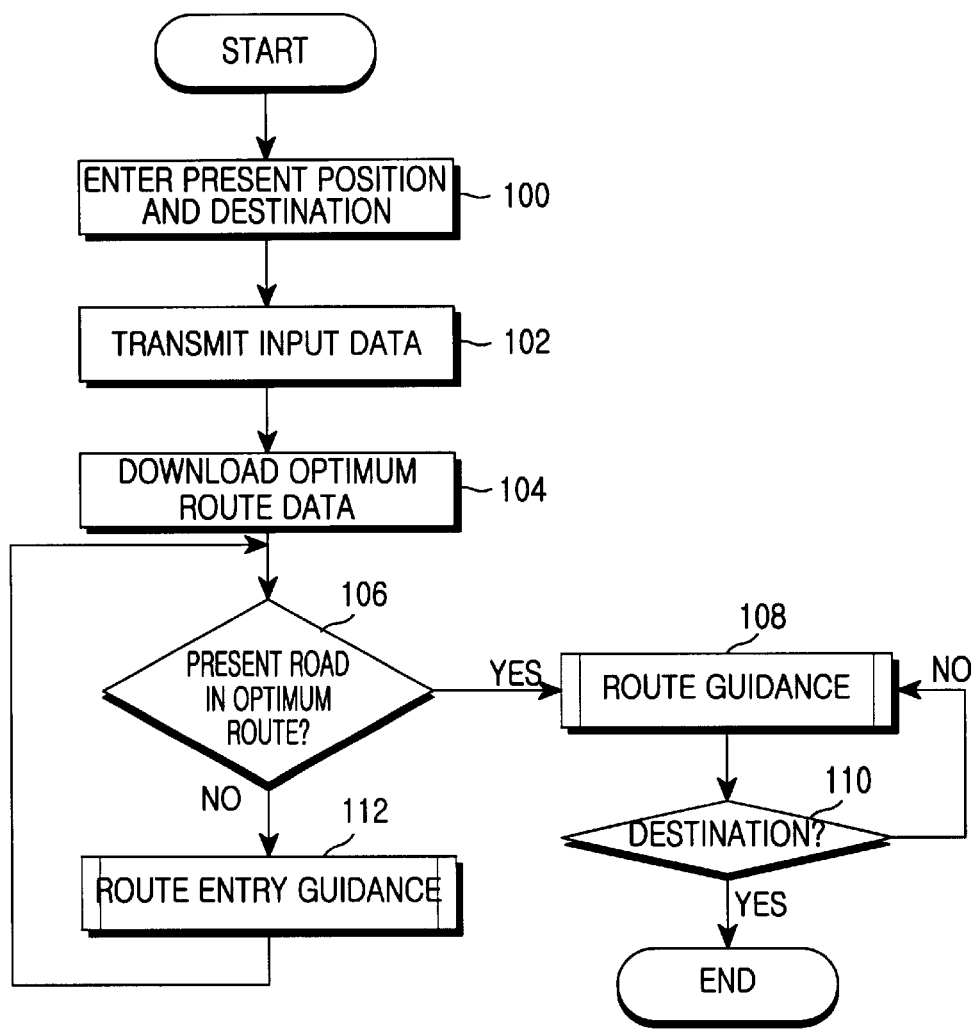
FIG. 7 is a flowchart illustrating a route entry guiding method according to the embodiment of the present invention.
Figure 8:
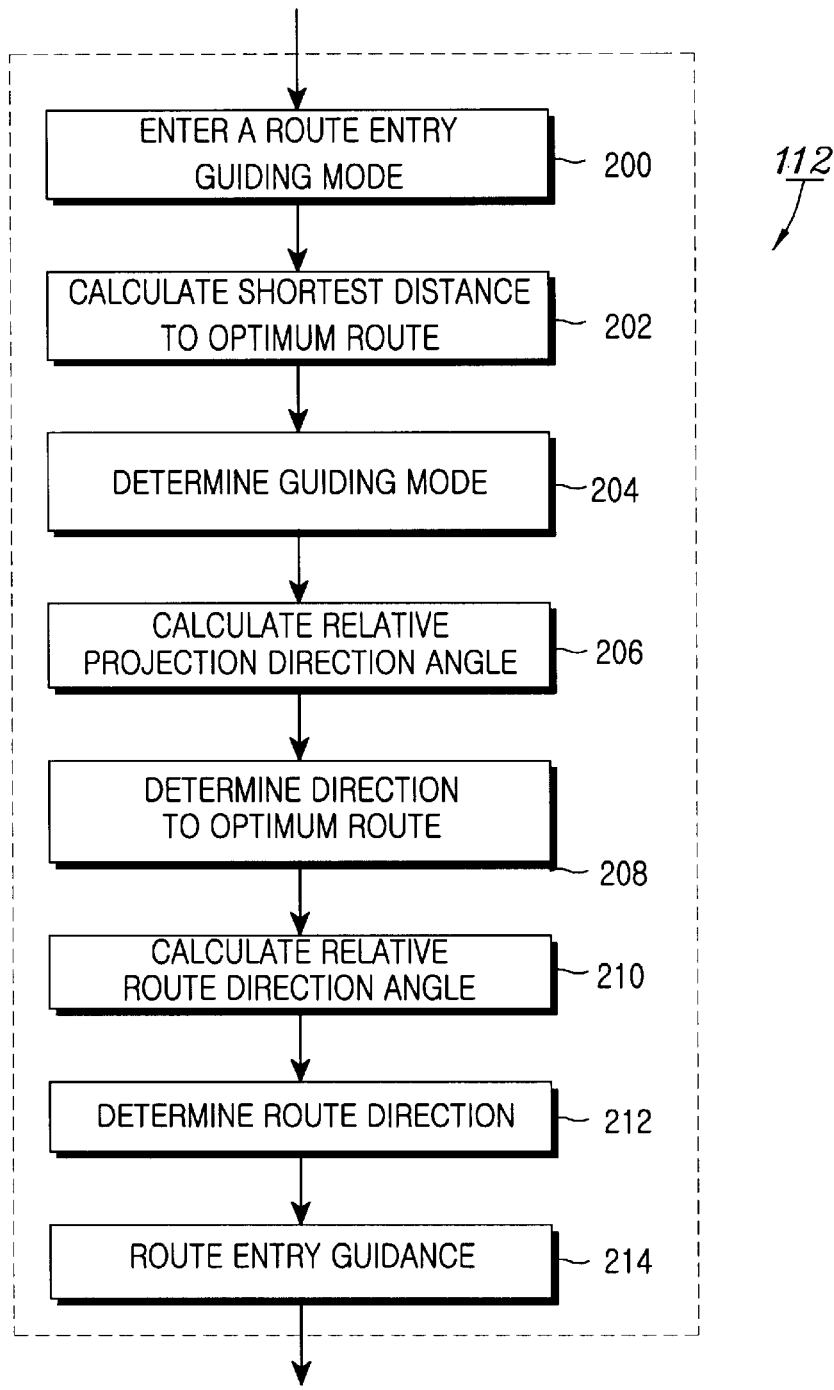
FIG. 8 is a flowchart illustrating in detail a route entry guiding routine illustrated in FIG. 7.

FIG. 7 is a flowchart illustrating a route entry guiding method according to the embodiment of the present invention and FIG. 8 is a flowchart illustrating a route entry guiding routine 112 illustrated in FIG. 7 in detail.

Referring to FIG. 7, the controller 10 recognizes entry of a departure point and a destination by a user in step 100. While the departure point and the destination can be entered by voice or text, or using a digital map, voice input is considered in the embodiment of the present invention. The controller 10 transmits the departure point and destination information to the traffic information service center by a wireless data service in step 102 and downloads optimum route data from the present position to the destination from the traffic information service center in step 104. The optimum route data is processed in a predetermined format to reflect traffic information so that an optimum route is routed and displayed on an LCD of the portable terminal.

In step 106, the controller 10 compares the optimum route data with the present position measured using sensor information received from the navigation sensor unit 14 and determines whether the road where the vehicle is currently positioned is in the optimum route. If the road is in the optimum route, the controller 10 provides route guidance (turning point guidance) audibly and visually in a known procedure in step 108 and determines whether the vehicle arrives at the destination in step 110. If the vehicle is at the destination, the procedure ends and otherwise, the controller 10 returns to step 110.

On the other hand, if the road is not in the optimum route in step 106, the controller 10 provides route entry guidance to guide the vehicle to the entry to the route in step 112. Then, the controller 10 returns to step 106 to determine whether to repeat the route entry guidance or provide the known route guidance according to whether the current road is in downloaded optimum route data. Step 106 is performed each time the present position of the vehicle is checked and its period can be set freely.

In the above procedure, the vehicle readily enters a road in a route on a digital map with the aid of route entry guidance and then receives known route guidance.

Referring to FIG. 8, the route entry guiding routine 112 illustrated in FIG. 7 will be described in detail in connection with FIG. 2. The controller 10 enters a route entry guiding mode in step 200, determines the shortest distance to the route in step 202, and determines a guiding mode according to the distance in step 204. In step 206, the controller 10 calculates a relative angle of a projection direction to the route with respect to the heading of the vehicle. The controller 10 determines the direction to the route according to the relative angle of the projection direction in step 208 and calculates a relative angle of the direction the route runs with respect to the vehicle heading in step 210. The controller 10 determines a route direction with respect to the present vehicle position according to the relative route direction angle in step 212 and provides route entry guidance according to the guiding mode in step 214.

FIG. 9 illustrates an embodiment of a method of guiding a vehicle to a route entry in each guiding mode according to the present invention.

Primary guidance: when the distance to the route is 150 m, the route is to the left of the vehicle, and the route runs in the same direction as the vehicle (i.e., a guiding mode C-(4)-①), "←" and "150 m" are displayed on the LCD, while a voice message "Turn left and go ahead 150 m to enter the route" is output. Then, the driver accesses the route according to traffic regulations and road conditions, recognizing that the route is to the left of the vehicle.

Secondary guidance: after traveling for some distance, the guiding mode is changed to B-(1)-② and the distance to the route is 80 m. "80 m" is displayed on the LCD, while a voice message "Turn right 80 m ahead to enter the route" is output. The driver recognizes that he is near the route and should turn right to enter the route.

Third guidance: after traveling for some more distance, the guiding mode is set to A-(4)-① and the distance to the route is 45 m. 45 m is within an error limit range of the GPS and digital map. Since the digital map is fabricated with respect to the central lines of roads, it is determined that the vehicle is in the route. Then, "↑" is displayed on the LCD, while a voice message "Go straight" is output. Thus, the driver enters the route and travels in the route direction.

For the primary to third guidance to the route entry, turning directions are displayed in first icon images with arrows overlapped with car marks. After the vehicle enters the route, second icon images of typical arrows (not shown) are used to indicate turning directions.

FIG. 10 illustrates another embodiment of the method of guiding a vehicle to a route entry in each guiding mode according to the present invention. As compared to the first embodiment, the vehicle is guided to access the route regardless of the route direction in the guiding mode C, the vehicle is guided to turn left due to a different route direction in the guiding mode B, and the vehicle is guided to go straight, assuming that the vehicle is already in the route since the distance to the route is 45 m even though the route is to the right of the vehicle in the second embodiment.

The reason for guiding the vehicle in the manners according to the first and second embodiment of the present invention instead of notifying the distance and direction to a route using projection points to the route is that the projections points continuously vary during traveling.

In accordance with the present invention as described above, a vehicle is rapidly and easily guided to the entry to an optimum route on a digital map through a portable terminal. Therefore, the driver can drive more conveniently.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A route entry guidance device in a navigation system using a portable terminal, including a navigation component, comprising:

a transmitter/receiver for transmitting information including a departure point and a destination entered by a user to a traffic information center over a wireless network and receiving optimum route data from the traffic information center over the wireless network in response to the transmitted information;

a guiding mode determiner for calculating a shortest distance to an optimum route indicated by the optimum route data and determining a guiding mode according to the shortest distance, if the optimum route data does not include a road where a vehicle is currently positioned;

a heading determiner for determining a heading of the vehicle with respect to true north using latitude and longitude coordinates of two points measured by a GPS (Global Positioning System);

a projection direction determiner for calculating a relative angle of a projection direction to the optimum route with respect to the vehicle and determining a direction to the optimum route according to the calculated relative projection direction angle; and a route direction determiner for calculating a relative angle of the direction the optimum route runs with respect to the vehicle and determining a route direction according to the calculated relative route direction angle, wherein the vehicle is guided to the entry to the optimum route according to the determined guiding mode, direction to the optimum route, and route direction.

2. The route entry guidance device of claim 1, wherein the navigation component further comprises a voice processor for providing route entry guidance by a voice signal.

3. The route entry guidance device of claim 1, wherein the navigation component further comprises a display for providing route entry guidance by a graphical signal.

4. The route entry guidance device of claim 1, wherein the projection direction determiner determines that the optimum route is ahead of the vehicle if the relative projection direction angle is 0° to 45° or 315° to 359°, that the optimum route is to the right of the vehicle if the relative projection direction angle is 46° to 135°, that the optimum route is behind the vehicle if the relative projection direction angle is 136° to 225°, and that the optimum route is to the left of the vehicle if the relative projection direction angle is 226° to 315°, and wherein the route direction determiner determines that the optimum route runs in the same direction as the vehicle if the relative route direction angle 0° to 45° or 315° to 359°, that the optimum route runs to the right of the vehicle if the relative route direction angle is 46° to 135°, that the optimum route runs in the opposite direction the vehicle travels if the relative route direction angle is 136° to 225°, and that the optimum route runs to the left of the vehicle if the relative route direction angle is 226° to 315°.

5. The route entry guidance device of claim 4, wherein if the shortest distance is less than a second value and the optimum route is ahead of the vehicle, icon images indicating a 12 o'clock direction, left turning, right turning, and a 6 o'clock direction are displayed respectively when the optimum route runs in the same direction as the vehicle, to the right of the vehicle, in the opposite direction to the vehicle heading, and to the left of the vehicle;

if the shortest distance is a first value or less and the optimum route is to the right or left of the vehicle, icon images indicating the 12 o'clock direction, the 12 o'clock direction, the 6 o'clock direction, and the 12 o'clock direction are displayed, respectively, when the optimum route runs in the same direction as the vehicle, to the right of the vehicle, in the opposite direction to the vehicle heading, and to the left of the vehicle;

if the shortest distance is the first value or less and the optimum route is behind the vehicle, an icon image indicating the 6 o'clock direction is displayed;

if the shortest distance is the first value or greater and the optimum route is to the right of the vehicle, an icon image indicating right is displayed; and if the shortest distance is the first value or greater and the optimum route is to the left of the vehicle, an icon image indicating left is displayed.

6. The route entry guidance device of claim 4, wherein if the shortest distance is less than the second value and the optimum route is ahead of the vehicle, voice messages guiding the vehicle to take the 12 o'clock direction, left turning, right turning, and the 6 o'clock direction are output, respectively, when the optimum route runs in the same direction as the vehicle, to the right of the vehicle, in the opposite direction to the vehicle heading, and to the left of the vehicle;

if the shortest distance is the first value or less and the optimum route is to the right or left of the vehicle, voice messages guiding the vehicle to take the 12 o'clock direction, the 12 o'clock direction, the 6 o'clock direction, and the 12 o'clock direction are output, respectively, when the optimum route runs in the same direction as the vehicle, to the right of the vehicle, in the opposite direction to the vehicle heading, and to the left of the vehicle;

if the shortest distance is the first value or less and the optimum route is behind the vehicle, a voice message guiding the vehicle to take the 6 o'clock direction is output;

if the shortest distance is the first value or greater and the optimum route is to the right of the vehicle, a voice message guiding the vehicle to travel to the right is output; and if the shortest distance is the first value or greater and the optimum route is to the left of the vehicle, a voice message guiding the vehicle to travel to the left is output.

7. A route entry guidance method in a navigation system using a portable terminal, comprising the steps of:

(1) receiving information including a departure point and a destination from a user;

(2) transmitting the departure point and destination information to a traffic information center;

(3) downloading optimum route information processed in a predetermined format from the traffic information center;

(4) checking whether the optimum route data contains a road corresponding to a present position of a vehicle measured by a navigation sensor; and (5) guiding the vehicle to an entry to an optimum route if the optimum route data does not include the road corresponding to the present vehicle position.

8. The route entry guidance method of claim 7, further comprising the step of re-measuring the present position of the vehicle during or after the route entry guidance and guiding the vehicle to the entry to the optimum route if the optimum route data does not contain a road corresponding to the re-measured present vehicle position.

9. The route entry guidance method of claim 8, wherein in the step of (S), a direction that the vehicle is supposed to take is displayed in a first icon image before the vehicle enters the optimum route and is displayed in a second icon image, which is different from the first icon image, after the vehicle enters the optimum route.

10. A method of guiding a vehicle to an entry to an optimum route when a road corresponding to a present position of the vehicle is not contained in optimum route data downloaded from a traffic information service center using a portable terminal, the method comprising the steps of:

calculating a shortest distance to the optimum route;

determining a guiding mode according to the shortest distance;

determining a heading of the vehicle with respect to true north using latitude and longitude coordinates of two points measured by a GPS (Global Positioning System);

calculating a relative angle of a projection direction to the optimum route as an angle between the heading of the vehicle and the projection direction to the optimum route and determining a direction to the optimum route according to the calculated relative projection direction angle;

calculating a relative angle of the direction the optimum route runs as an angle between the heading of the vehicle and the direction the optimum route runs with respect to the vehicle and determining a route direction according to the calculated relative route direction angle; and guiding the vehicle to the entry to the optimum route according to the determined guiding mode, direction to the optimum route, and route direction.

* * * * *